United States Patent
Gukeisen et al.

(10) Patent No.: US 7,434,405 B2
(45) Date of Patent: Oct. 14, 2008

(54) BLEED DIFFUSER FOR GAS TURBINE ENGINE

(75) Inventors: Robert Gukeisen, Middletown, CT (US); Peter G. Smith, Wallingford, CT (US); Ronald S. Walther, Granby, CT (US)

(73) Assignee: United Technologies Corporation, Hartford, CT (US)

( * ) Notice: Subject to any disclaimer, the term of this patent is extended or adjusted under 35 U.S.C. 154(b) by 368 days.

(21) Appl. No.: 11/140,787

(22) Filed: May 31, 2005

(65) Prior Publication Data

US 2006/0266051 A1    Nov. 30, 2006

(51) Int. Cl.
    *F02C 6/08* (2006.01)
(52) U.S. Cl. .................... 60/785; 251/129.11
(58) Field of Classification Search ............ 60/785, 60/782, 39.23; 251/129.11
    See application file for complete search history.

(56) References Cited

U.S. PATENT DOCUMENTS

| | | | |
|---|---|---|---|
| 2,217,299 A * | 10/1940 | Taylor | 251/129.2 |
| 3,638,428 A | 2/1972 | Shipley et al. | |
| 4,280,678 A * | 7/1981 | Roberts | 251/61.2 |
| 4,702,070 A * | 10/1987 | Cureton et al. | 60/785 |
| 4,715,779 A | 12/1987 | Suciu | |
| 5,477,673 A * | 12/1995 | Blais et al. | 60/785 |
| 5,632,141 A | 5/1997 | Sloop et al. | |
| 6,048,171 A | 4/2000 | Donnelly et al. | |
| 6,349,738 B2 * | 2/2002 | Dyson et al. | 137/114 |
| 6,588,195 B2 | 7/2003 | Negulescu | |
| 6,695,578 B2 | 2/2004 | Winslow et al. | |

FOREIGN PATENT DOCUMENTS

EP        1728992       *  6/2006

* cited by examiner

*Primary Examiner*—Ted Kim

(57) ABSTRACT

A gas turbine engine includes a compressor section, a combustion section communicating with and disposed downstream of the compressor section relative to a direction of airflow, and a gas turbine section communicating with and disposed downstream of the combustion section relative to a direction of airflow. One of the sections has a wall defining an opening to access an airflow through the sections. A bleed diffuser assembly is disposed over the opening, and includes a housing including inlet and outlet ends. A diffuser having inlet and outlet ends is movably disposed within the housing. An actuator is coupled to the diffuser for moving the diffuser generally toward the inlet end of the housing and into an operative position when the actuator is energized. A biasing member is provided for urging the diffuser generally toward the outlet end of the housing and into a retracted position when the actuator is de-energized.

12 Claims, 2 Drawing Sheets

US 7,434,405 B2

BLEED DIFFUSER FOR GAS TURBINE ENGINE

FIELD OF THE INVENTION

This invention relates generally to a gas turbine engine, and more particularly to a bleed diffuser and deflector for a gas turbine engine.

BACKGROUND OF THE INVENTION

Gas turbine engines, such as those used for aircraft propulsion, typically include a bleed valve arrangement for diverting pressurized working medium fluid from a main flow path. One common use of such a valve arrangement is to channel fluid, as necessary, from the engine's primary flow path to a coannular secondary flow path to temporarily improve the aerodynamic stability of the engine's compression system.

It is common to bleed a portion of the inlet air from a gas turbine engine for a variety of purposes. Common purposes include providing a pressure differential on opposite sides of bearing seals to preclude oil leaks, to cool or heat components of the turbojet engine to control operational clearances, or to provide air conditioning or warm air to an aircraft cabin.

Typically, the air is tapped or bled at the gas turbine engine compressor and can be tapped between the low pressure compressor and the high pressure compressor, or from the cold air flow when the turbojet engine is of the turbo fan type. The selection of the source of the bleed air depends upon the desired temperatures and pressures of the air.

A drawback with some diffusers is that the diffusers project into the gas turbine engine fan stream even when not in operation so as to impede airflow and decrease engine performance.

In view of the foregoing, it is an object of the present invention to provide a bleed diffuser for a gas turbine engine that overcomes the above-mentioned drawbacks and disadvantages.

SUMMARY OF THE INVENTION

In a first aspect of the present invention, a bleed diffuser assembly for a gas turbine engine includes a housing including an inlet end and an outlet end. A diffuser having an inlet end and an outlet end is movably disposed within the housing. An actuator is coupled to the diffuser for moving the diffuser generally toward the inlet end of the housing and into an operative position when the actuator is energized. A biasing member such as, for example, a spring or other resilient member is provided for urging the diffuser generally toward the outlet end of the housing and into a retracted position when the actuator is de-energized.

In a second aspect of the present invention, a gas turbine engine includes a compressor section, a combustion section communicating with and disposed downstream of the compressor section relative to a direction of airflow, and a gas turbine section communicating with and disposed downstream of the combustion section relative to a direction of airflow. At least one of the sections has a wall defining an opening for access to an airflow through the sections. A bleed diffuser assembly is to be disposed over the opening. The bleed diffuser assembly includes a housing including an inlet end and an outlet end. A diffuser having an inlet end and an outlet end is movably disposed within the housing. An actuator is coupled to the diffuser for moving the diffuser generally toward the inlet-end of the housing and into an operative position when the actuator is energized. A biasing member is provided for urging the diffuser generally toward the outlet end of the housing and into a retracted position when the actuator is de-energized.

DETAILED DESCRIPTION OF THE PREFERRED EMBODIMENT

Figure 1:
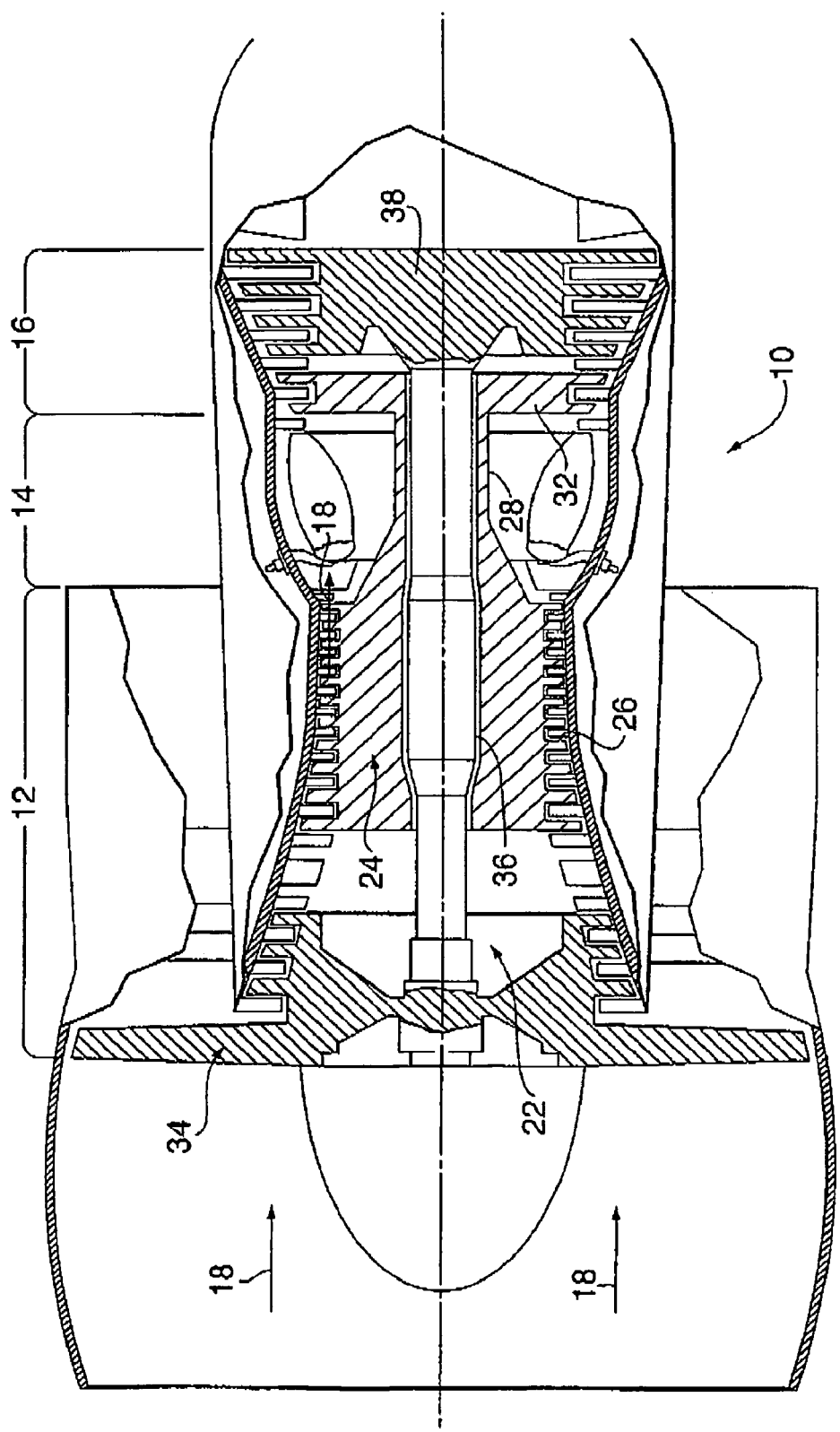
FIG. 1 is a side elevation schematic view of a gas turbine engine with the engine partially broken away to show a portion of the compressor section of the engine.

FIG. 1 is a side elevation, simplified view of an example of a gas turbine engine 10. The view is partially broken away to show elements of the interior of the engine. The engine 10 includes a compression section 12, a combustion section 14 and a turbine section 16. An airflow path 18 for working medium gases extends axially through the engine 10. The engine 10 includes a first, low pressure rotor assembly 22 and a second, high pressure rotor assembly 24. The high pressure rotor assembly 24 includes a high pressure compressor 26 connected by a shaft 28 to a high pressure turbine 32. The low pressure rotor assembly 22 includes a fan and low pressure compressor 34 connected by a shaft 36 to a low pressure turbine 38. During operation of the engine 10, working medium gases are flowed along the airflow path 18 through the low pressure compressor 26 and the high pressure compressor 34. The gases are mixed with fuel in the combustion section 14 and burned to add energy to the gases. The high pressure working medium gases are discharged from the combustion section 14 to the turbine section 16. Energy from the low pressure turbine 38 and the high pressure turbine 32 is transferred through their respective shafts 36, 28 to the low pressure compressor 34 and the high pressure compressor 26.

Figure 2:
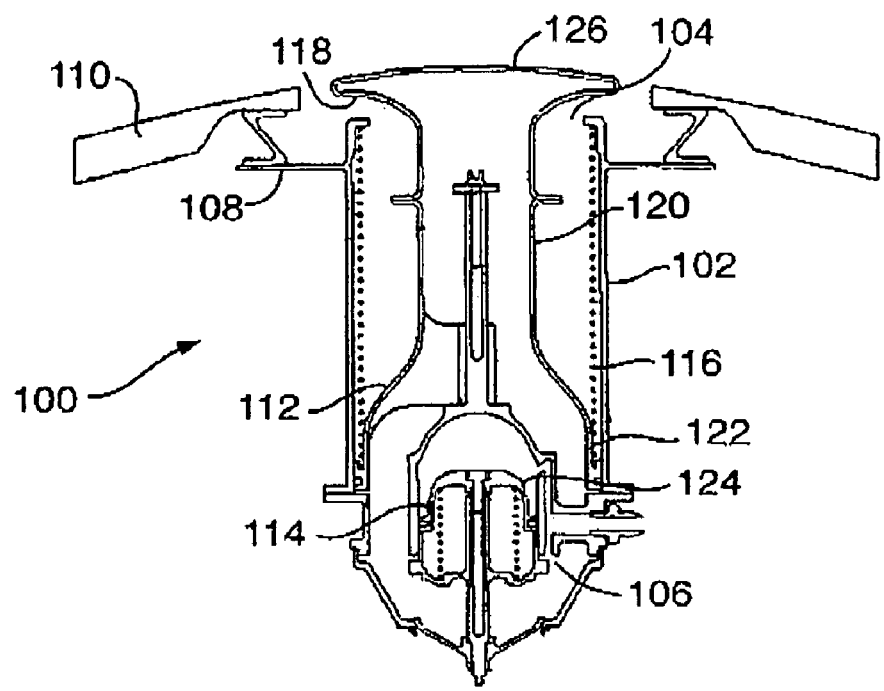
FIG. 2 is a side elevation view of a bleed diffuser for a gas turbine engine when in an unactuated condition.
Figure 3:
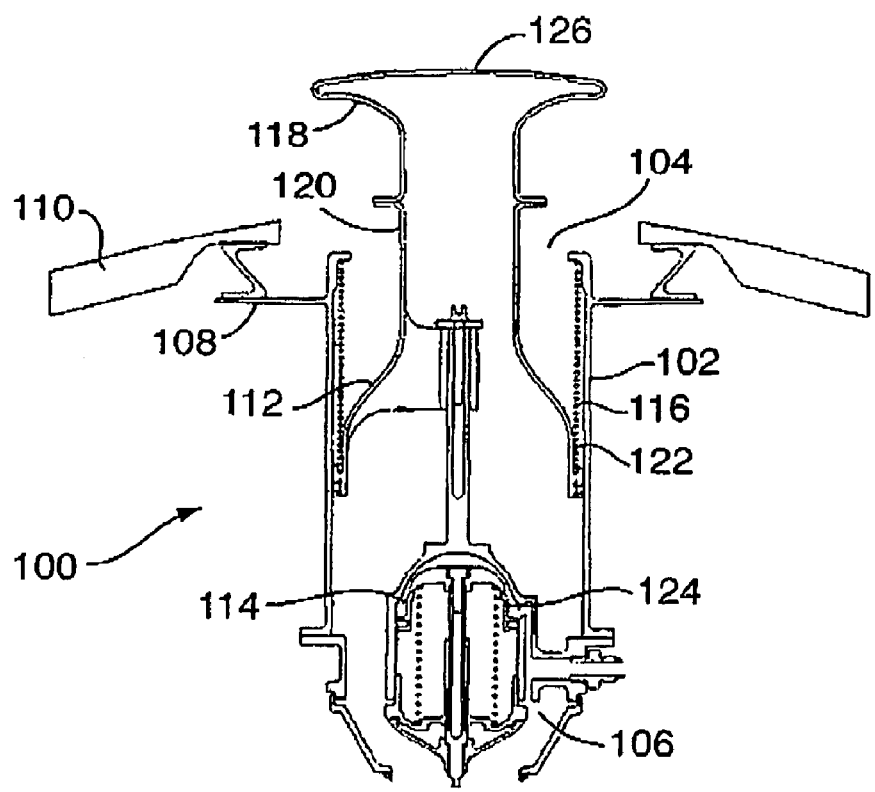
FIG. 3 is a side elevation view of the gas turbine engine bleed diffuser of FIG. 2 when in an actuated condition.

With reference to FIGS. 2 and 3, a bleed diffuser assembly for a gas turbine engine in accordance with the present invention is indicated generally by the reference number 100. FIG. 2 illustrates the diffuser assembly 100 when in an unactuated condition, and FIG. 3 illustrates the diffuser assembly when in an actuated condition.

The diffuser assembly 100 comprises a housing 102 having an inlet end 104 and an outlet end 106. The housing 102, preferably cylindrical in shape, has a flange 108 at the inlet end 104 for mounting over an opening defined on a wall 110 of a gas turbine engine. Preferably, the diffuser assembly 100 is disposed in a compressor section of an engine, but is not limited in this regard. The diffuser assembly 100 further comprises a diffuser 112 axially movably disposed within the housing 102, an actuator 114 energized by a controller (not shown) for moving the diffuser 112 into an operative position, and a biasing member 116 such as a spring or other resilient member for restoring the diffuser into a retracted position.

The diffuser 112 includes an outwardly flared inlet portion 118, a reduced diameter cylindrical body portion 120, and an outwardly flared outlet portion 122. The actuator 114 includes, for example, an electrical motor 124 and is disposed within the housing 102 adjacent to the outlet end 106. The actuator 114 is coupled to the diffuser 112 for moving the diffuser into the operative position. The biasing member 116 is disposed within the housing 102 about a portion of the diffuser 112 between the inlet end 104 of the housing and the outwardly flared outlet portion 122 of the diffuser.

In operation, when the diffuser assembly 100 is in an unactuated condition, the diffuser 112 is in the retracted position as shown in FIG. 2. In the retracted position, an inlet end 126 of the diffuser 112 is adjacent to the inlet end 104 or the mounting flange 108 of the housing 102 so as to be generally flush with the wall 110 and out of the path of an airflow through the gas turbine engine. When the motor 124 of the actuator 114 is energized by a controller, the actuator moves the diffuser 112 toward the inlet end 104 of the housing 102 such that the inlet end 126 of the diffuser moves outside of and away from the inlet end of the housing and projects beyond the wall 110 and into an airflow of the gas turbine engine to permit air to be directed through the diffuser. As the diffuser 112 moves toward the inlet end 104 of the housing 102 into the operative position, the distance between the inlet end of the housing and the outwardly flared outlet portion 122 of the diffuser progressively decreases so as to compress and thereby increase a restorative force in the biasing member 116 disposed therebetween.

When the motor 124 of the actuator 114 is de-energized by a controller, the restorative force in the biasing member 116, urging against the outwardly flared outlet portion 122 of the diffuser 112, is released so as to move the diffuser away from the inlet end 104 of the housing 102 until the inlet end 126 of the diffuser is generally flush with the wall 110 and out of the path of an airflow through the gas turbine engine. As a result the gas turbine engine is free of static hardware extending therein so as to reduce fan duct losses and allow improved engine performance.

As will be recognized by those of ordinary skill in the pertinent art, numerous modifications and substitutions can be made to the above-described embodiment of the present invention without departing from the scope of the invention. Accordingly, the preceding portion of this specification is to be taken in an illustrative, as opposed to a limiting sense.

What is claimed is:

1. A bleed diffuser assembly for a gas turbine engine, the diffuser assembly comprising:
   a housing including an inlet end and an outlet end;
   a diffuser movably disposed within the housing, the diffuser having an inlet end and an outlet end;
   an actuator coupled to the diffuser for moving the diffuser generally toward the inlet end of the housing and into an operative position when the actuator is energized; and
   a biasing member for urging the diffuser generally toward the outlet end of the housing and into a retracted position when the actuator is de-energized
   wherein an inlet end of the diffuser is disposed adjacent to an inlet end of the housing when the diffuser is in the retracted position, and the inlet end of the diffuser is disposed outside of the housing and further away from the inlet of the housing relative to the retracted position when the diffuser is in the operative position.

2. A bleed diffuser assembly as defined in claim 1, wherein the biasing member includes a spring.

3. A bleed diffuser assembly as defined in claim 1, wherein the spring is disposed within the housing about the diffuser.

4. A bleed diffuser assembly as defined in claim 3, wherein the spring includes a first end disposed adjacent to the inlet end of the housing, and includes a second end to be biased against a portion of the diffuser.

5. A bleed diffuser assembly as defined in claim 1, wherein the actuator includes an electrical motor.

6. A bleed diffuser assembly as defined in claim 1, further comprising a mounting flange disposed generally at the inlet end of the housing.

7. A gas turbine engine comprising:
   a compressor section;
   a combustion section communicating with and disposed downstream of the compressor section relative to a direction of airflow;
   a gas turbine section communicating with and disposed downstream of the combustion section relative to a direction of airflow;
   at least one of the sections having a wall defining an opening for access to an airflow through the sections;
   a bleed diffuser assembly to be disposed over the opening, the bleed diffuser assembly including:
   a housing including an inlet end and an outlet end;
   a diffuser movably disposed within the housing, the diffuser having an inlet end and an outlet end;
   an actuator coupled to the diffuser for moving the diffuser generally toward the inlet end of the housing and into an operative position when the actuator is energized; and
   a biasing member for urging the diffuser generally toward the outlet end of the housing and into a retracted position when the actuator is de-energized
   wherein an inlet end of the diffuser is disposed adjacent to an inlet end of the housing when the diffuser is in the retracted position, and the inlet end of the diffuser is disposed outside of the housing and further away from the inlet of the housing relative to the retracted position when the diffuser is in the operative position.

8. A gas turbine engine as defined in claim 7, wherein the biasing member includes a spring.

9. A gas turbine engine as defined in claim 7, wherein the spring is disposed within the housing about the diffuser.

10. A gas turbine engine as defined in claim 9, wherein the spring includes a first end disposed adjacent to the inlet end of the housing, and includes a second end to be biased against a portion of the diffuser.

11. A gas turbine engine as defined in claim 7, wherein the actuator includes an electrical motor.

12. A gas turbine engine as defined in claim 7, further comprising a mounting flange disposed generally at the inlet end of the housing.

* * * * *